United States Patent
Nordman

(10) Patent No.: US 10,059,429 B2
(45) Date of Patent: Aug. 28, 2018

(54) EMBEDDED TEAR STRAPS IN METAL STRUCTURES

(71) Applicant: The Boeing Company, Chicago, IL (US)

(72) Inventor: Paul S. Nordman, Renton, WA (US)

(73) Assignee: The Boeing Company, Chicago, IL (US)

( * ) Notice: Subject to any disclaimer, the term of this patent is extended or adjusted under 35 U.S.C. 154(b) by 222 days.

(21) Appl. No.: 14/696,364

(22) Filed: Apr. 24, 2015

(65) Prior Publication Data

US 2016/0311051 A1  Oct. 27, 2016

(51) Int. Cl.
| | | |
|---|---|---|
| *B64C 1/00* | (2006.01) | |
| *B64C 3/26* | (2006.01) | |
| *B64C 1/12* | (2006.01) | |
| *B23K 20/10* | (2006.01) | |
| *B64C 3/20* | (2006.01) | |
| *B23K 20/233* | (2006.01) | |
| *B23K 101/00* | (2006.01) | |
| *B23K 103/10* | (2006.01) | |

(52) U.S. Cl.
CPC .............. *B64C 3/26* (2013.01); *B23K 20/103* (2013.01); *B23K 20/2333* (2013.01); *B64C 1/12* (2013.01); *B64C 3/20* (2013.01); *B23K 2201/006* (2013.01); *B23K 2203/10* (2013.01); *B64C 2001/0081* (2013.01); *Y02T 50/42* (2013.01)

(58) Field of Classification Search
CPC .............. B64C 1/068; B64C 1/12; B64F 5/10
See application file for complete search history.

(56) References Cited

U.S. PATENT DOCUMENTS

| | | | | |
|---|---|---|---|---|
| 3,976,269 A * | 8/1976 | Gupta | ....................... | B64C 1/12 |
| | | | | 181/287 |
| 4,406,720 A * | 9/1983 | Wang | ................... | B29C 65/086 |
| | | | | 156/181 |
| 4,741,943 A | 5/1988 | Hunt | | |
| 5,842,317 A * | 12/1998 | Pettit | ........................ | B64F 5/60 |
| | | | | 52/514 |
| 6,814,823 B1 * | 11/2004 | White | ................ | B23K 11/0013 |
| | | | | 156/73.1 |
| 7,571,928 B2 * | 8/2009 | Soejima | .............. | B60R 21/2165 |
| | | | | 280/728.3 |
| 8,038,099 B2 | 10/2011 | Anast et al. | | |
| 2005/0211839 A1 * | 9/2005 | Movsesian | ................ | B64C 1/40 |
| | | | | 244/119 |
| 2005/0275197 A1 * | 12/2005 | Kaifuki | ............. | B60R 21/21656 |
| | | | | 280/728.3 |

(Continued)

OTHER PUBLICATIONS

"How it Works," http://fabrisonic.com/uam-overview, downloaded on Mar. 11, 2015.

(Continued)

*Primary Examiner* — Elizabeth A Quast
(74) *Attorney, Agent, or Firm* — Miller, Matthias & Hull LLP

(57) ABSTRACT

A method comprises embedding tear straps in a metal aircraft structure having a fully formed contour and thickness. The tear straps include strips of fibers that are substantially stronger and stiffer than the metal aircraft structure. The fibers are embedded beneath at least one surface of the metal aircraft structure via ultrasonic consolidation.

16 Claims, 4 Drawing Sheets

(56) References Cited

U.S. PATENT DOCUMENTS

2014/0268604 A1* 9/2014 Wicker ................. B29C 70/885
                                                        361/760
2016/0236789 A1* 8/2016 Burns ................... B64C 39/024
2017/0001589 A1* 1/2017 An ........................ B60R 21/045

OTHER PUBLICATIONS

Amy L. Cowan, "Crack Path Bifurcation at a Tear Strap in a Pressurized Stiffened Cylindrical Shell," Aug. 24, 1999.

Farley et al., "Selective reinforcement to improve fracture toughness and fatigue crack growth resistance in metallic structures," 45th AIAA/ASME/ASCE/AHS/ASC Structures, Structural Dynamics and Materials Conference, Apr. 2004.

"Metal Matrix Composites," http://fabrisonic.com/metal-matrix-composites/, downloaded on Mar. 11, 2015.

* cited by examiner

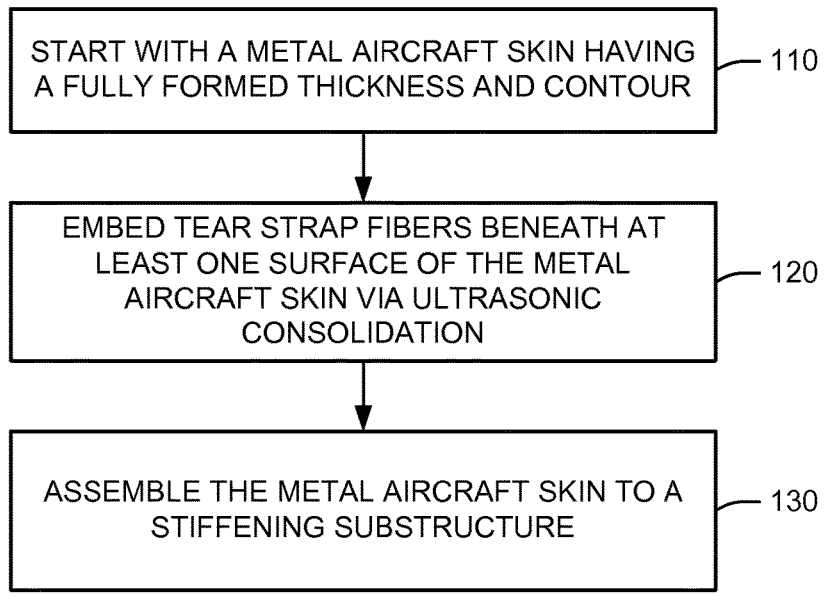
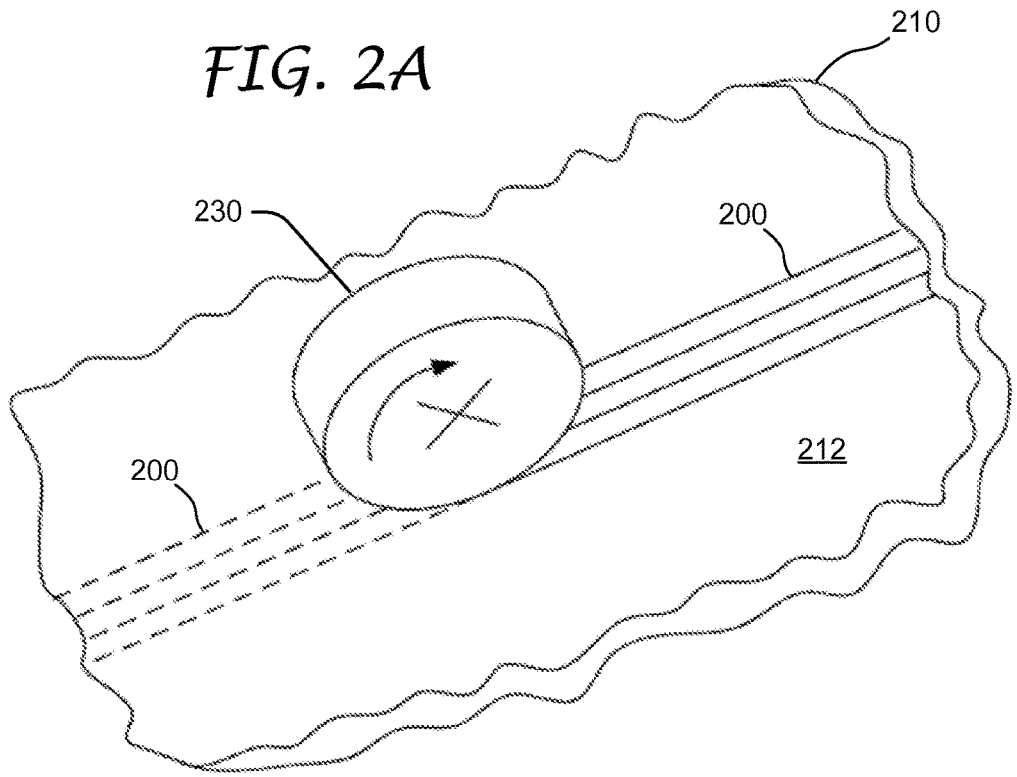

EMBEDDED TEAR STRAPS IN METAL STRUCTURES

BACKGROUND

Tear straps may be added to aircraft skin to provide damage tolerance. For instance, tear straps may be added to arrest the propagation of cracks in aircraft skin.

In the absence of tear straps, stiffening structures such as frames and stringers may be configured to arrest the propagation of cracks in the aircraft skin. These stiffening structures are increased in size to carry both regular loads and damage arrest loads.

Typically, the tear strips are individually fastened and/or bonded to discrete portions of an inner surface of the aircraft skin.

SUMMARY

According to an embodiment herein, a method comprises embedding tear straps in a metal aircraft structure having a fully formed contour and thickness. The tear straps include strips of fibers that are substantially stronger and stiffer than the metal aircraft structure. The fibers are embedded beneath at least one surface of the metal aircraft structure via ultrasonic consolidation.

According to another embodiment herein, a system comprises a metal structure, tear straps including fibers that are substantially stronger and stiffer than the metal structure, and an end effector for embedding the fibers of the tear straps beneath a surface of the metal structure. The end effector includes a head for depositing the strips on the surface of the metal structure, a wheel-shaped horn for applying pressure to the fibers as the fibers are being deposited, and a source for applying ultrasonic vibrations to the wheel-shaped horn.

According to another embodiment herein, an aircraft comprises a fuselage, a wing assembly, and an empennage. Metal skin of at least one of the fuselage, wing assembly and empennage includes embedded tear straps. The embedded tear straps include fibers embedded beneath a surface of the metal skin. The fibers are substantially stiffer and stronger than the metal skin. The tear straps do not entirely cover the metal skin.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of a method of adding damage arrest features to a metal aircraft structure.

FIGS. 2A and 2B are illustrations of aircraft skin having embedded tear straps.

DETAILED DESCRIPTION

Figure 2B:
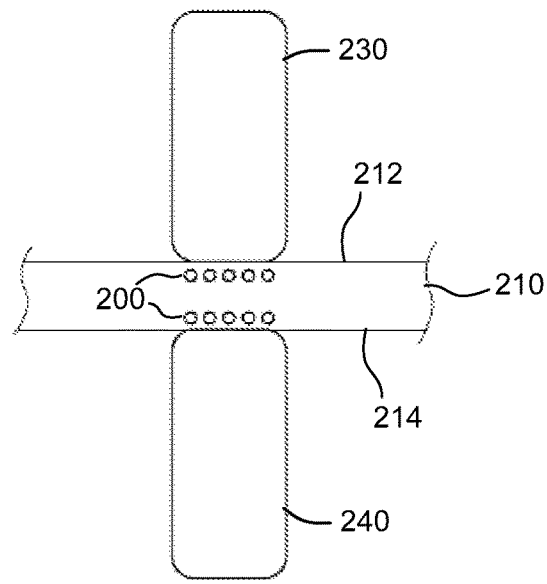

Reference is made to FIG. 1, which illustrates a method of adding damage arrest features to a metal aircraft skin. The metal aircraft skin may include one or more sheets of a metal such as aluminum.

The damage arrest features include tear straps, which are designed and located to arrest the propagation of cracks in the metal aircraft skin. Each tear strap has the form of a strip of fibers extending preferably in a single direction (that is, the fibers are unidirectional). In some configurations, however, the fibers may be in the form of fabric or a braid.

These fibers are substantially stronger than the metal aircraft skin. The fibers may be at least six times stronger than the metal aircraft skin.

Preferably, the tear straps are not embedded in the entire metal aircraft skin. If the fibers are substantially stronger than the metal aircraft skin, then a crack in the metal aircraft skin can be carried by a relatively narrower tear strap. Consider an example in which the fibers have a strength of 450 ksi and the metal aircraft skin has a strength of 70 ksi. With the metal aircraft skin and the tear strap each having 50% of the area at 50% fiber volume, the strength of the embedded tear strap is theoretically 260 ksi. Now consider that 0.040 inch thick skin at a damage tolerance condition is carrying a load at a 20 ksi stress, and the tear straps are spaced apart at 18 inches. Assume a crack propagates in the metal aircraft skin between two tear straps. For this 18 inch wide crack, the load at each end of the crack is 20 ksi×18 in×0.040 in/2=7,200 lb. If the strength of the tear strap region is 260 ksi, then the tear strap area required to carry the load is 7,200 lb/260 ksi=0.0277 square inches. If each tear strap has a thickness of 0.010 inches, and if tear straps are embedded in opposite surfaces of the metal aircraft skin, then the width of each tear strap may be 0.0277 in$^2$/0.010 in/2=1.39 inches. Thus, quite narrow tear straps can carry the load of the crack.

The metal aircraft skin is substantially thicker than the tear straps. In general, the ratio of skin thickness to tear strap thickness is approximately 10:1.

The ratio of skin thickness to fiber diameter is approximately 100:1. As but one example, one type of individual fiber has a diameter of 0.0004 inches in diameter, and the metal aircraft skin has a thickness of 0.040 inches.

The fibers may be in the form of rovings (a roving is a loose assembly of fibers without twisting). For example, a roving has 400 fibers.

The rovings may be arranged side by side. For example, a tear strap having a width of three inches may be formed by laying 75 rovings side by side.

The fibers may be substantially stiffer than the metal aircraft skin. The fibers may be at least five times stiffer than the metal aircraft skin. In some configurations, however, the fibers may be less than five times stiffer, and may even be as stiff as the metal aircraft skin.

The fibers may also have a lower strain to failure than the metal aircraft skin.

The fibers may be metal or non-metal, so long as they are substantially stronger than the metal aircraft skin. For metal aircraft skin made of aluminum and similar metals, the fibers may be selected from a group consisting of aramid fibers, ceramic fibers, and silica carbide fibers. These fibers are substantially stiffer than aluminum aircraft skin, and they have a lower strain to failure than aluminum aircraft skin. These fibers are also compatible with aluminum and don't cause aluminum aircraft skin to corrode.

At block 110, the method starts with a metal aircraft skin having a fully formed thickness and contour. The reason for starting with such a structure is that bending and drawing the metal aircraft skin will be difficult after the tear straps have been embedded. Portions of the metal aircraft skin may be removed later (e.g., openings may be formed, a paint system may be added) without affecting the thickness and contour of the metal aircraft skin.

Additional reference is made to FIG. 2A. At block 120 of the method, the tear straps are embedded in the metal aircraft skin 210 by embedding rovings of fibers 200 beneath at least one surface 212 of the metal aircraft skin 210 via ultrasonic consolidation. In FIG. 2A, the embedded fibers 200 are represented by dash lines, and the fibers 200 prior to embedding are represented by solid lines. The fibers 200 may be embedded at least 0.001 inches beneath the surface 212 of the metal aircraft skin 210.

The ultrasonic consolidation may include (a) applying pressure using a wheel-shaped horn 230 to force the fibers 200 against the metal aircraft skin 210 while (b) applying high-frequency (typically 20,000 hertz) ultrasonic vibrations to the fibers 200 and the metal aircraft skin 210. This combination of pressure and vibrations causes the fibers 200 to be embedded in the metal aircraft skin 210. In some instances, the metal aircraft skin 210 may be heated to around 300° F. for better processing. An example of a system for embedding the tear straps is described below.

The tear straps may be embedded beneath a single surface 212 of the metal aircraft skin 210 (either an inner surface or an outer surface), as illustrated in FIG. 2A, or they may be embedded beneath both surfaces of the metal aircraft skin 210.

Additional reference is made to FIG. 2B, which illustrates fibers 200 embedded beneath opposite surfaces 212 and 214 of metal aircraft skin 210. Wheel-shaped horns 230 and 240 at both surfaces 212 and 214 apply embedding pressure and transmit acoustic vibrations to the fibers 200 and the metal aircraft skin 210. The vibrations are preferably applied to both surfaces 212 and 214 of the metal aircraft skin 210. If vibrations are applied only to one surface 212 or 214, inertia of the metal aircraft skin 210 may prevent the vibrations from embedding the fibers 200 beneath the other surface.

With reference to FIG. 1, at block 130, the metal aircraft skin with the embedded tear straps is assembled to a stiffening substructure. For example, the metal aircraft skin may be fastened to stiffeners such as frames and stringers.

The embedded tear straps locally increase the strength of the metal aircraft skin to carry a load propagating from a damaged area. The embedded tear straps function as well as, or better than, conventional tear straps, which are bonded or attached to a surface of metal aircraft skin.

However, since the tear straps are embedded in the metal aircraft skin, they may be smaller than conventional tear straps. As a result, the embedded tear straps may be lighter than conventional tear straps. The lighter tear straps can reduce weight, fuel and other aircraft operating costs. In addition, material and processes for securing the embedded tear straps (e.g., fasteners, adhesive) are eliminated.

The method is not limited to metal aircraft skin. It may be used to embed tear straps in other metal aircraft structures. For example, tear straps may be embedded beneath the surfaces of metal aircraft structures such as metal stiffeners (e.g., frames, stringers, spars, pressure bulkheads, and ribs).

Figure 3:
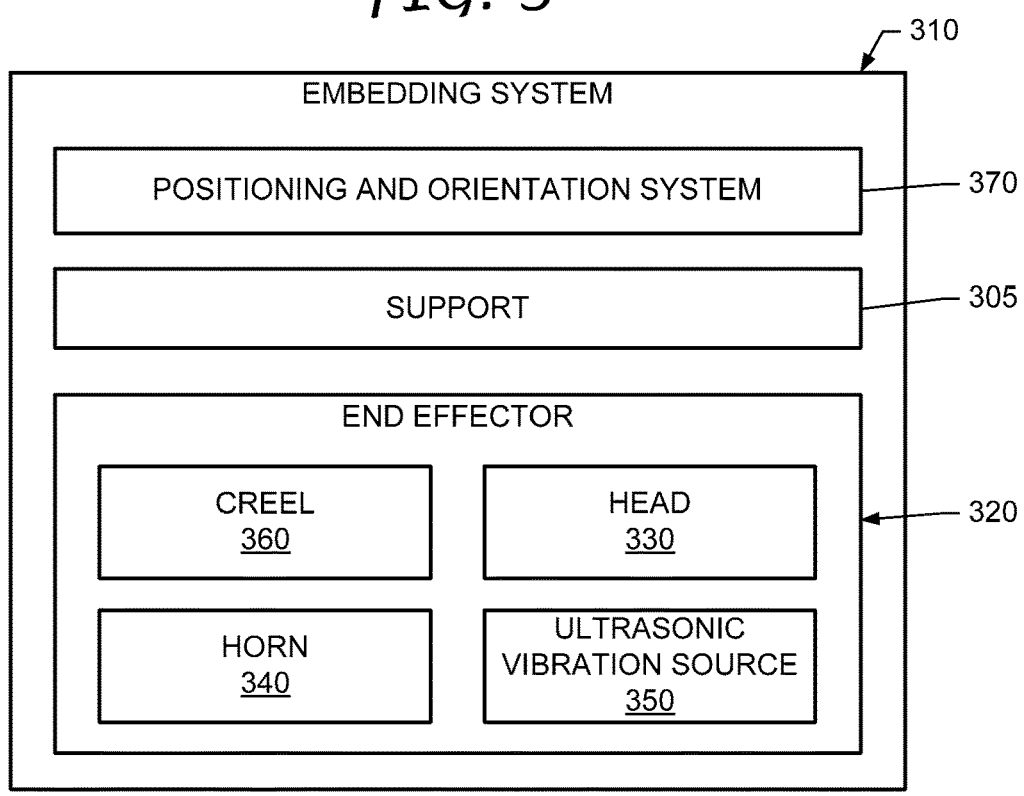
FIG. 3 is an illustration of a system for embedding tear straps in an aircraft structure.

Reference is now made to FIG. 3, which illustrates an embedding system 310 for embedding tear straps in a metal structure. The embedding system 310 includes a support (e.g., a table) 305 for supporting the metal structure, and an end effector 320 for embedding the fibers of the tear straps beneath at least one surface of the metal structure. The end effector 320 includes a head 330 for depositing the strips of the fibers on a surface of the metal structure, a wheel-shaped horn 340 for pressing the deposited fibers into the metal structure, and a source 350 (e.g., acoustic transducers) for applying ultrasonic vibrations to the wheel-shaped horn 340. The wheel-shaped horn 340 transmits the ultrasonic vibrations to the deposited fibers as the deposited fibers are being pressed into the metal structure.

The end effector 320 may also include a creel 360 for storing the rovings of fibers. The creel 360 supplies the rovings to the head 330.

The embedding system 310 may also include a positioning and orientation system 370. The positioning and orientation system 370 may include, for example, a robot, a gantry, or a combination of the two. The positioning and orientation system 370 may position and orient the end effector 320 relative to the support 305, or it may position and orient the support 305 relative to the end effector 320, or it may do a combination of the two.

Although FIG. 3 illustrates a single end effector 320, the embedding system 310 is not so limited. As a first example, the embedding system 310 may have at least one additional end effector 320 for embedding tear straps beneath another (e.g., opposite) surface of the metal structure. As a second example, the embedding system 310 may include different end effectors 320 for embedding tear straps in different directions in the metal structure. As a third example, multiple end effectors 320 may be used to embed tear straps beneath different portions of the same surface.

Figure 4:
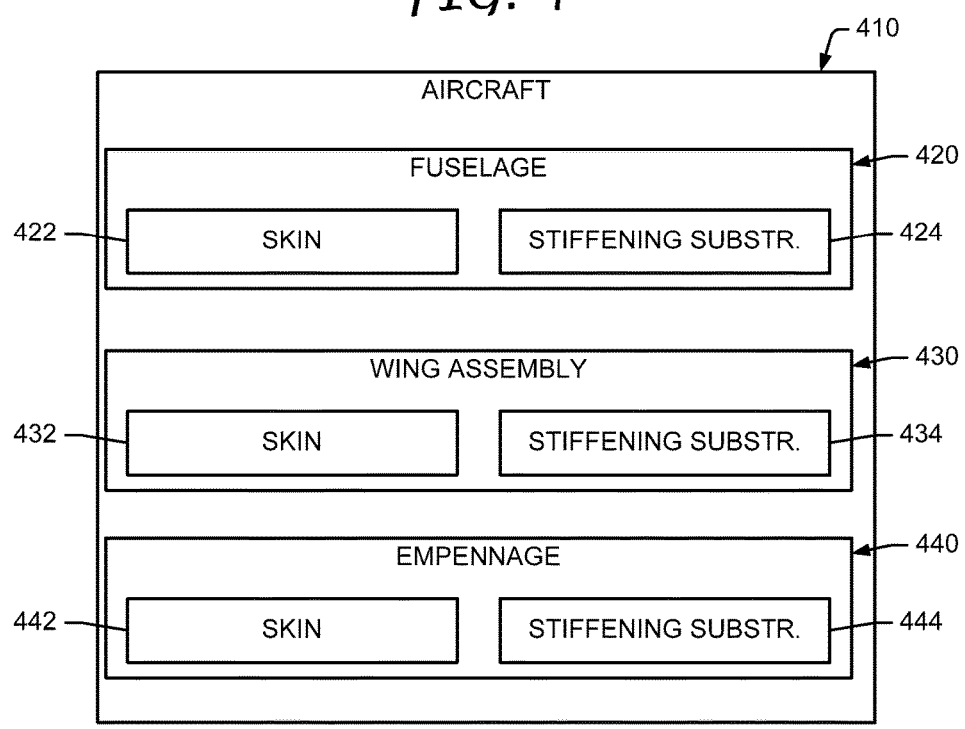
FIG. 4 is an illustration of an aircraft.

Reference is now made to FIG. 4, which illustrates an aircraft 410. The aircraft 410 includes a fuselage 420, wing assembly 430, and an empennage 440. Each of these structures 420, 430 and 440 includes metal skin 422, 432 and 442 and a stiffening substructure 424, 434 and 444. The stiffening substructure 424 of the fuselage 420 includes frames and stringers. The stiffening substructures 434 and 444 of the wing assembly 430 and the empennage 440 include spars, ribs and stringers. The metal skin 422, 432 and 442 of at least one of the fuselage 420, the wing assembly 430 and the empennage 440 includes embedded tear straps.

In some aircraft 410, the skin may be panelized. A skin panel includes metal aircraft skin and it may include stiffeners.

Figure 5:
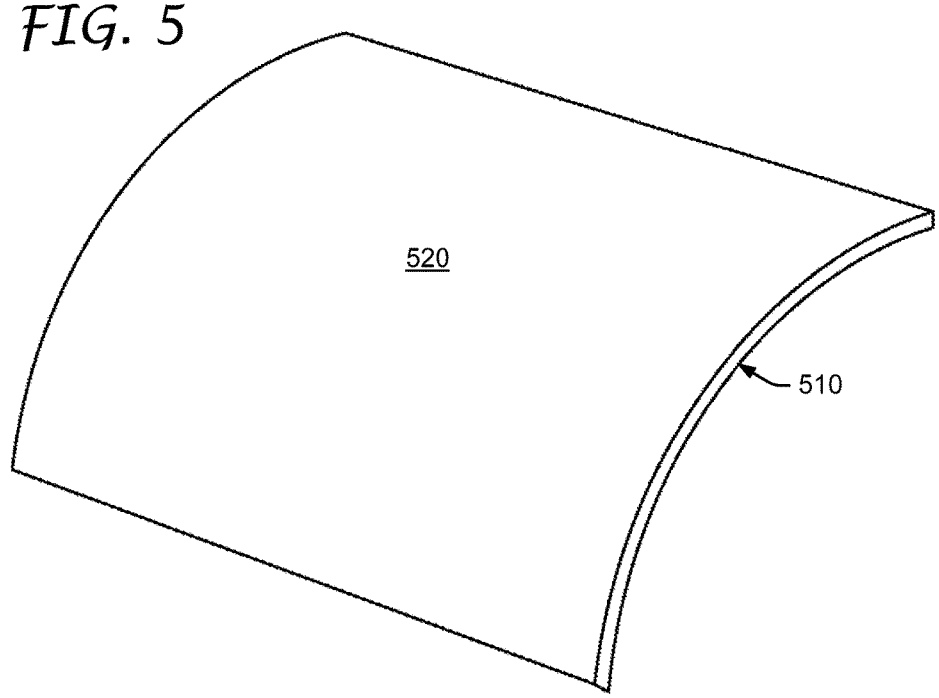
FIG. 5 is an illustration of a skin panel prior to embedding tear straps.

FIG. 5 illustrates a skin panel 510 for a fuselage before tear straps have been embedded. Skin 520 of the skin panel 510 has a fully formed contour and thickness. The tear straps will be embedded before any stiffeners are attached to the skin 520.

Figure 6:
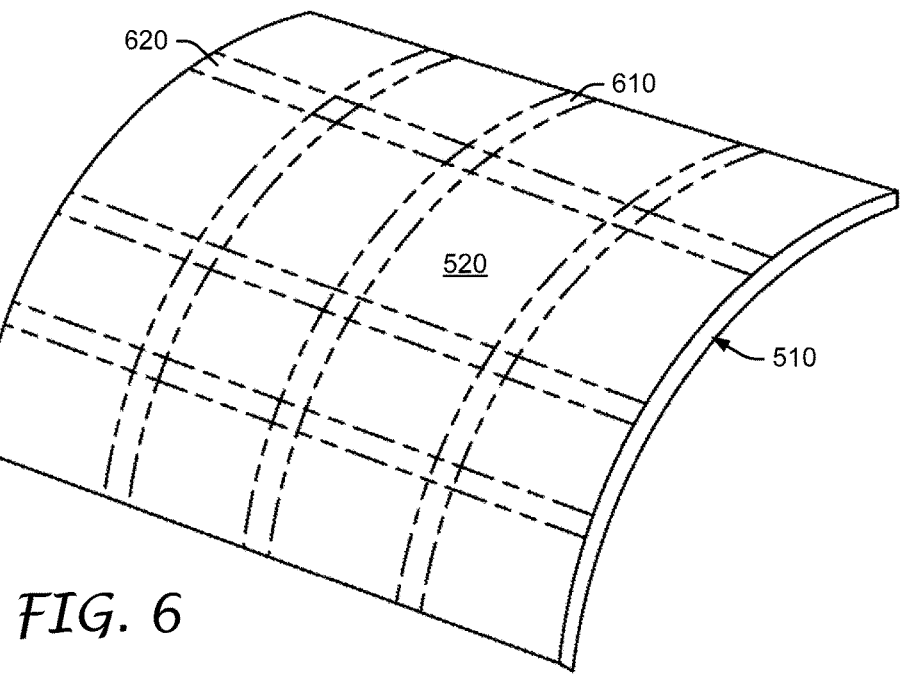
FIG. 6 is an illustration of the skin panel after tear straps have been embedded.

FIG. 6 illustrates the skin panel 510 after an ortho-grid of tear straps 610 and 620 has been embedded. Some of the tear straps 610 extend in a circumferential direction, and others of the tear straps 620 extend in a longitudinal or forward-aft direction. The longitudinal tear straps 620 intersect the circumferential tear straps 610 at substantially right angles. At an intersection of two tear straps 610 and 620, one of the tear straps is embedded deeper than the other of the tear straps.

A first set of the tears straps 610 and 620 may be embedded beneath an inner surface of the skin 520, and a second set of tear straps 610 and 620 may be embedded beneath an outer surface of the skin 520. In contrast, conventional tear straps are attached only to an inner skin surface.

If tear straps 610 and 620 are embedded beneath both inner and outer surfaces, the circumferential tear straps 610 embedded beneath the inner and outer surfaces are preferably aligned, and the longitudinal tear straps 620 embedded beneath the inner and outer surfaces are preferably aligned. However, the tear straps 610 and 620 are not so limited.

In the fuselage, the circumferential tear straps 610 may be located at frames, but are not so limited. The longitudinal tear straps 620 may be located at stringers, but are not so limited.

The tear straps are not limited to an ortho-grid. For example, the tear straps may be arranged in a diamond pattern.

Although the method and system above are described in connection with aircraft structures, they are not so limited. Non-aerospace structures include pressure vessels.

The invention claimed is:

1. A method comprising embedding tear straps in a metal aircraft structure having a fully formed contour and thickness, the tear straps including strips of fibers that are stronger and stiffer than the metal aircraft structure, the strips of fibers embedded beneath at least one surface of the metal aircraft structure with an ultrasonic consolidation end effector, the end effector including a head for depositing the strips of fibers on the at least one surface of the metal aircraft structure, a wheel-shaped horn for applying pressure to the strips of fibers as the strips of fibers are being deposited, and a source for applying ultrasonic vibrations to the wheel-shaped horn.

2. The method of claim 1, wherein the strips of fibers are at least six times stronger than the metal aircraft structure.

3. The method of claim 1, wherein the strips of fibers are at least five times stiffer than the metal aircraft structure.

4. The method of claim 1, wherein the tear straps do not entirely cover the metal aircraft structure.

5. The method of claim 1, further comprising fully forming the metal aircraft structure prior to embedding the tear straps.

6. The method of claim 1, wherein the strips of fibers are selected from a group consisting of aramid fibers and ceramic fibers.

7. The method of claim 1, wherein the strips of fibers of each tear strap are unidirectional and embedded as rovings.

8. The method of claim 7, wherein the rovings are embedded at least 0.001 inches beneath the at least one surface of the metal aircraft structure.

9. The method of claim 1, wherein the metal aircraft structure includes a metal aircraft skin; and wherein the strips of fibers are embedded in the metal aircraft skin.

10. The method of claim 9, wherein a ratio of skin thickness to tear strap thickness is approximately 10:1.

11. The method of claim 9, wherein the strips of fibers are embedded in inner and outer surfaces of the metal aircraft skin, and wherein embedding pressure and vibrations are applied to the strips of fibers on both surfaces of the metal aircraft skin during the ultrasonic consolidation.

12. The method of claim 9, wherein the metal aircraft skin includes a metal fuselage skin; and wherein the tear straps extend in circumferential and longitudinal directions in the metal fuselage skin.

13. The method of claim 9, further comprising assembling the metal aircraft skin to a stiffening substructure after the tear straps have been embedded in the metal aircraft skin.

14. The method of claim 1, wherein the metal aircraft structure includes a metal aircraft skin that is panelized, and wherein the strips of fibers are embedded beneath inner and outer surfaces of the metal aircraft skin.

15. A system comprising:
a metal aircraft structure;
tear straps including fibers that are stronger and stiffer than the metal aircraft structure; and
an ultrasonic consolidation end effector for embedding the fibers of the tear straps beneath a surface of the metal aircraft structure, the end effector including a head for depositing the fibers on the surface of the metal aircraft structure, a wheel-shaped horn for applying pressure to the fibers as the fibers are being deposited, and a source for applying ultrasonic vibrations to the wheel-shaped horn.

16. The system of claim 15, wherein the metal aircraft structure includes a metal aircraft skin.

* * * * *